INVENTORS W. B. GROTH
H. N. SECKLER
BY
[signature]
ATTORNEY

July 11, 1961 W. B. GROTH ET AL 2,992,410
SELECTOR FOR SWITCHING NETWORK
Filed Feb. 28, 1956 2 Sheets-Sheet 2
FIG. 2
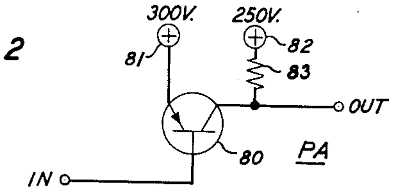
FIG. 3
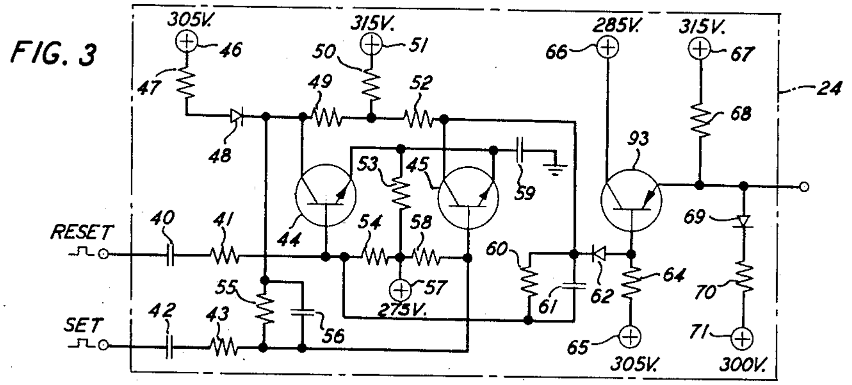
FIG. 4
| | PASSIVE | | ACTIVE | | | |
|---|---|---|---|---|---|---|
| | | | FAN OUT | | BREAKDOWN | |
| | V VOLTS | I MA | V VOLTS | I MA | V VOLTS | I MA |
| INPUT 20 | 302 | 0 | 285 | 0 | 285 | 0 |
| INPUT 23 | 302 | 0 | 302 | 17.8 | 302 | 17.8 |
| INPUT 24 | 303 | 3.2 | 285 | −64 | 285 | −64 |
| INPUT 27 | 303 | 3.2 | 303 | 3.2 | 303 | 3.2 |
| INPUT 32 | 253 | 0 | 300 | 0 | 300 | 0 |
| INPUT 35 | 253 | 0 | 253 | 32.75 | 253 | 30.5 |
| GATE A1 | 302.2 | .8 | 298 | −13 | 298 | −13 |
| GATE A5 | 302.2 | .8 | 302 | .8 | 302 | .8 |
| GATE A16 | 302.2 | .8 | 302.2 | .8 | 302.2 | .8 |
| AMP. PA1 | 252 | 8 | 298 | 205 | 298 | 205 |
| AMP. PA16 | 252 | 8 | 252 | 8 | 252 | 8 |
| GATE B1 | 250.65 | 0 | 294.7 | 0 | 255.9 | 0 |
| GATE B16 | 250.65 | 0 | 253 | −13.1 | 253 | −12.2 |
| GATE C1(T1) | 250.35 | .5 | 294.7 | 1 | 248.5 | 15 |
| GATE C2 (T2) | 250.35 | .5 | 253 | .5 | 253 | .5 |
| GATE C256 (T256) | 250.35 | .5 | 250.35 | .5 | 250.35 | .5 |
| GATE C17 (T17) | 250.35 | .5 | 250.35 | .5 | 250.35 | .5 |
INVENTORS W. B. GROTH
H. N. SECKLER
BY [signature]
ATTORNEY United States Patent Office 2,992,410
Patented July 11, 1961

2,992,410
SELECTOR FOR SWITCHING NETWORK

Willard B. Groth, Tuckahoe, and Howard N. Seckler, New York, N.Y., assignors to Bell Telephone Laboratories, Incorporated, New York, N.Y., a corporation of New York Filed Feb. 28, 1956, Ser. No. 568,405
7 Claims. (Cl. 340—166)

This invention relates to selecting circuits and more particularly to matrix selectors which control the operation of electronic switching networks.

An electronic switching network includes a number of electronic devices which are selectively operated to establish one of many possible paths through the network. The electronic devices may be, for example, gas tubes as disclosed in the Bruce-Straube Patent 2,684,405, granted on July 20, 1954, or transistors as disclosed in the Bjornson-Bruce Patent 2,876,285 granted on March 3, 1959. In these disclosures, the electronic switching network is utilized in a telephone system to establish connections between lines and trunks. To establish a connection through an electronic switching network, terminals at the two ends of the network, or at internal junction points in the network, are selected and marked. A terminal is marked when the potential at the terminal is changed or when the current through the terminal is changed. More specifically a terminal is marked when the potential at the terminal is increased to the network breakdown potential for establishing a path through the network. In the above-identified disclosures of Bruce et al. and Bjornson et al., a line end terminal and a trunk end terminal are marked to establish a line-to-trunk connection or path through the switching network.

A general object of this invention is to improve the operation of matrix selectors utilized for selecting and marking terminals of an electronic switching network.

Another object of this invention is to improve the flexibility of matrix selectors whereby the marking of different size switching networks can readily be accomplished.

A further object of this invention is to allow for changes in the size of the matrix selector without changing the output potential or current conditions.

A further object of this invention is to decrease the power consumption of matrix selectors.

A further object of this invention is to decrease the response interval of matrix selectors so that short duration input control pulses may be utilized.

Still another object of this invention is to decrease the impedance presented by an active matrix selector to an electronic switching network.

Still another object of this invention is to reduce the active selector impedance while also reducing the passive selector power consumption.

These and other objects are accomplished by an illustrative embodiment of this invention wherein the matrix selector is utilized to control the operation of a gas tube switching network of the type disclosed in the above-identified disclosure of Bruce et al. The matrix selector is connected between fast operating logic circuits, which supply the control input pulses to the selector, and the relatively slow responding gas tube switching network.

A feature of this invention relates to means for providing a relatively long marking potential to the electronic switching network responsive to short input control pulses from the logic circuits. The marking potential-providing means includes memory devices which also function to match the selector input impedance with that of the logic circuits.

With the selector located between the logic circuits and the electronic switching network, the selector must be compatible from an impedance standpoint with the network as well as with the logic circuits. Due to the current requirements of the operated gas tube switching network, the active selector should present a low impedance to provide for the impedance compatibility.

A further feature of this invention, therefore, relates to means for providing a low impedance input to the gas tube switching network when marking potentials are applied thereto. In other words, the active selector output impedance is relatively small.

In accordance with the illustrative embodiment of this invention, the selector has two input stages and one output stage of semiconductor diode matrices. One of the input matrices and the output matrix utilize a number of single diode AND gates, each of which draws essentially no current when passive. An AND gate is passive when control potentials are not provided to both of its input terminals. The other input matrix utilizes a number of double diode AND gates which provide a low impedance when active or when control potentials are provided to both of its input terminals.

A further feature of this invention relates to the combined AND gate multistage diode matrix. The utilization of a combined matrix accomplishes the double advantage of active low impedance and passive low power consumption.

Another feature of this invention relates to means for reverse-biasing all the diodes in all three matrices when the selector is passive. By reverse-biasing all the diodes, the passive power consumption is maintained low.

Still another feature of this invention relates to impedance transformation amplifiers which are connected between the two single diode AND gate stages to compensate for the impedance effect which the input or primary single diode AND gate stage presents to the output stage.

The size of the double diode AND gate may be readily changed to increase or decrease the number of possible switching network terminals that can be marked. The output stage may therefore be rectangular as well as square. The double diode AND gate stage and the output stage may be changed without changing the number of amplifiers or the size of the input single diode AND gate stage.

A further object of this invention, therefore, is to increase the flexibility of a matrix selector so that the number of outputs can be readily changed without increasing the size of one of the input stages or the number of impedance transformation amplifiers.

The size of the single diode AND gate input stage may also be readily changed to increase or decrease the number of possible switching network terminals. Increasing the size of the single diode AND gate input stage increases the number of required impedance transformation amplifiers which connect the two single diode AND gate stages. Increasing the size of the single diode AND gate input stage and the number of amplifiers, however, does not change the voltage and current conditions at any point in the selector. The passive and marking conditions remain, therefore, the same with changes in size of the selector.

Further objects and features will become apparent upon consideration of the following description taken in conjunction with the drawing wherein:

FIG. 2 is a circuit representation of the impedance transformer amplifier utilized in the selector of this invention;

FIG. 3 is a circuit representation of one of the input memory devices of the selector of this invention; and FIG. 4 is a table which lists typical voltages and currents in the selector of this invention in order to illustrate the operation thereof.

Figure 1:
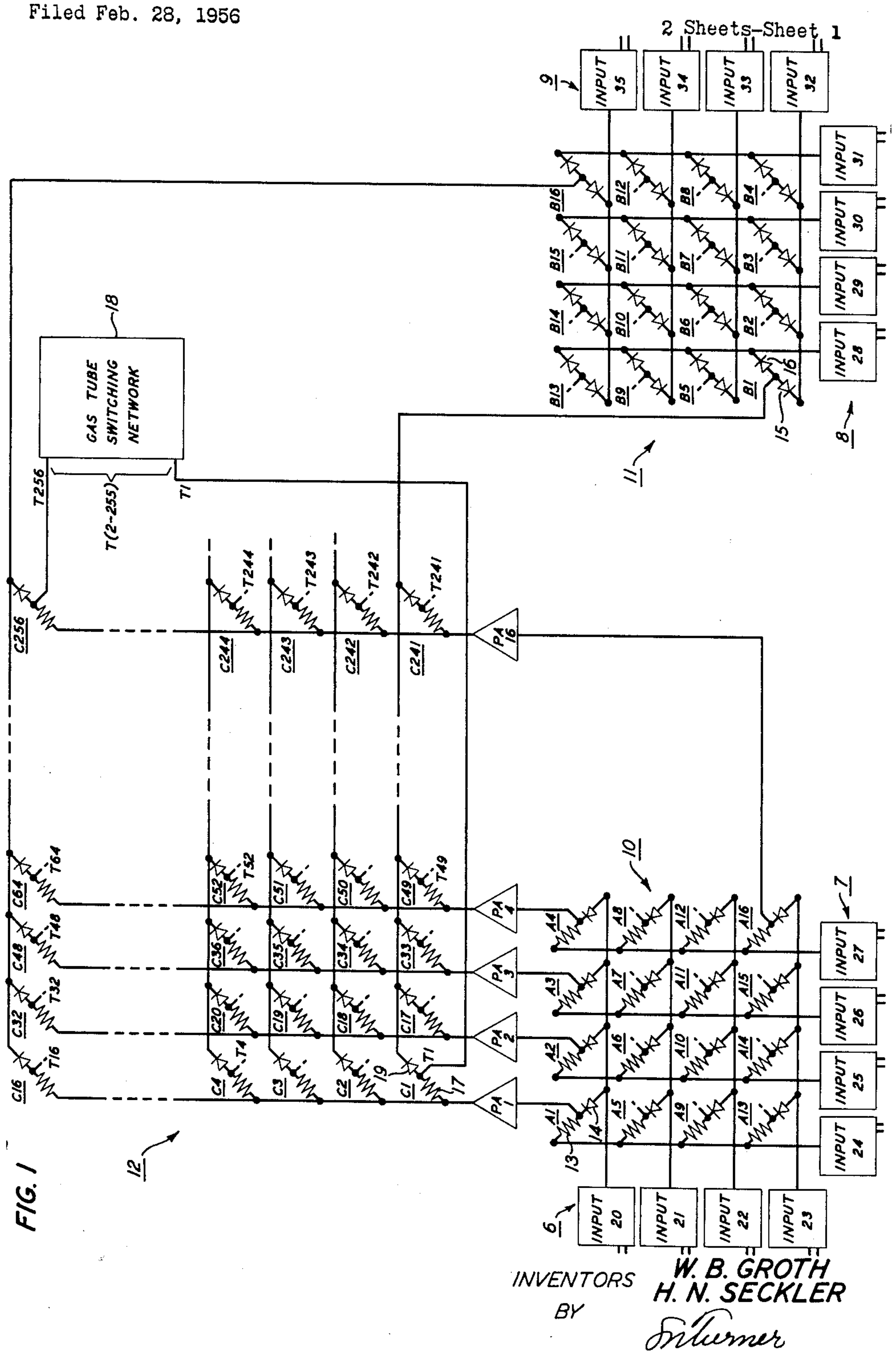
FIG. 1 is a circuit representation of the matrix selector of this invention.

Referring to FIG. 1, the selector has two input matrix stages 10 and 11 and one output matrix stage 12. The input stages 10 and 11 are controlled by the sixteen input circuits 20–35 which are arranged in four groups 6–9. One of the input circuits in each of the four groups 6–9 is activated to operate the matrix selector. For example, the matrix selector may be operated by activating the circuits 20, 24, 28 and 32. Each of the input stages 10 and 11 is a four-by-four matrix which energizes one out of sixteen paths to the output stage 12. The output stage 12 is a sixteen-by-sixteen matrix which, under control of the input stages 10 and 11, functions to energize or mark one of the 256 terminals T(1–256) of the gas tube switching network 18. The network 18 is of the type described in the above-identified disclosure by Bruce et al. When a positive mark potential is applied to one of the terminals T(1–256), one of many possible paths is established from the marked terminal through the network 18.

The selector has three different electrical conditions: a passive condition with the input circuits 20–35 normal or reset; a fan-out condition with selected ones of the input circuits 20–35 activated and the switching network 18 normal; and a breakdown condition with the selected ones of the input circuits 20–35 activated or set and network 18 operated. For each of these three electrical conditions typical voltages and currents at a number of illustrative places in the selector are shown in table form in FIG. 4.

*Passive condition*

Each of the input circuits 20–35 is a bistable transistor circuit which may be of the type described in the Pearsall-Staehler Patent 2,877,357 granted on March 10, 1959. The four input circuits 20–23 are similar, the four input circuits 24–27 are similar and the eight input circuits 28–35 are similar. The details of the input circuit 24 are shown in FIG. 3 by way of example.

The input circuit 24 has a multivibrator or flip-flop section which includes the transistors 44 and 45 and an output amplifier section which includes the transistor 93. The transistors 44 and 45 are NPN junction transistors and the transistor 93 is a PNP junction transistor.

Positive set and reset pulses are applied from logic circuits, not shown, to the base electrodes of the transistors 45 and 44, respectively. A turn-off or reset terminal is connected through the capacitor 40 and resistor 41 to the base electrode of the transistor 44, and a turn-on or set terminal is connected through the capacitor 42 and resistor 43 to the base electrode of the transistor 45. The collector and base electrodes of the transistors 44 and 45 are interconnected, with the collector electrode of transistor 44 being connected by resistor 55 and capacitor 56 to the base electrode of transistor 45 and the collector electrode of transistor 45 being connected by the capacitor 61 and the resistor 60 to the base electrode of transistor 44. The collector electrodes of transistors 44 and 45 are also connected through resistors 49 and 52, respectively, and the common resistor 50 to the plus 315-volt battery 51. The base electrodes of transistors 44 and 45 are connected through the resistors 54 and 58, respectively, to the plus 275-volt battery 57. The emitter electrodes of transistors 44 and 45 are connected to the battery 57 through the common resistor 53 and to ground through the capacitor 59. In the drawing, all batteries are presumed to have the terminal, which is not shown, connected to ground.

With the selector passive, the circuit 24 is in a normal or reset condition with transistor 44 conductive and transistor 45 nonconductive. The collector electrodes of the transistors 44 and 45 are connected to the clamping varistors 48 and 62, respectively. The varistor 48 is connected to the plus 305-volt potential source 46 through the resistor 47 and the varistor 62 is connected to the base electrode of the amplifier transistor 93. The collector electrode of transistor 45 is, in this manner, directly connected through the varistor 62 so as to directly couple the amplifier section to the multivibrator section of the input circuit 24. The base electrode of the transistor 93 is connected to the plus 305-volt potential source 65 through the resistor 64, and the collector electrode of transistor 93 is connected to the plus 285-volt potential source 66. With transistor 45 nonconductive, the potential at its collector electrode is substantially at the plus 315-volt potential of battery 51. The plus 315-volt potential at the collector of transistor 45 functions to reverse-bias the varistor 62. With varistor 62 reverse-biased, the transistor 93 is nonconductive or off. When transistor 93 is nonconductive, the potential at its base electrode is at plus 305 volts and the emitter potential is at plus 303 volts. The passive output potential of plus 303 volts at the emitter electrode is provided by the voltage divider action of resistors 68 and 70 which are serially connected, with a varistor 69 between the plus 315-volt battery 67 and the plus 300-volt battery 71.

When the transistor 45 is turned on, its collector potential decreases to forward-bias the varistor 62 to cause the potential at the base electrode of transistor 93 to decrease. When the base potential decreases below the plus 303-volt emitter potential, transistor 93 becomes conductive. With transistor 93 conductive, the forward-biased varistor 62 functions to clamp the transistor 45 out of saturation at the potential of the base electrode of transistor 93. When transistor 93 is conductive, the base electrode is at plus 285 volts which is also the potential at the output terminal. When the potential at the output terminal or at the emitter electrode of transistor 93 decreases from plus 303 volts to plus 285 volts, the varistor 69 becomes reverse-biased and the transistor 93, as is hereinafter described, functions as a sink to receive current from the input stage 10 to which it is connected. With the selector passive, however, the input circuit 24 provides 3.2 milliamperes to the input stage 10. The 3.2-milliampere passive input current is provided mainly from battery 67.

The input circuits 25—27 are identical to the circuit 24 shown in FIG. 3, functioning as a sink when active. The input circuits 28—35 are similar to the circuit 24 but provide different output voltages and currents because the values of some of the components are different and because the external impedance or load provided by the stage 11 is different than that provided by the stage 10 to the circuits 24—27. One further difference between the circuits 28—35 and the circuit 24 is that the input terminals of the circuits 28—35 are designated oppositely than those of circuit 24. The set terminal of circuit 24 is designated reset for circuits 28—35. In other words, in each of the circuits 28—35, the transistor 44 is normally nonconductive and the transistors 45 and 93 are normally conductive, which conductive conditions are the reverse in circuit 24. As indicated in FIG. 4, the circuits 28—35 provide a passive output potential of plus 253 volts and an active potential of plus 300 volts.

The input circuits 20—23 are also substantially similar to the circuit 24. The component values, however, are different. The output load presented by stage 10 to circuits 20—23 is different than the load presented to circuit 24 by stage 10; accordingly, varistor 69 is shorted or replaced by a wire, and the voltage of battery 71 is increased. The input set and reset terminals are not reversely designated so that transistors 45 and 93 are normally nonconductive. As indicated in FIG. 4, the circuits 20—23 provide a passive output potential of plus 302 volts and an active output potential of plus 285 volts. Both batteries 67 and 71 function as current sources, as is hereinafter described, when the selector is activated. In circuits 20—23, the magnitude of the potential of batteries 67 and 71 is such as to provide for turning on the amplifier transistor 93 without supplying output current from circuits 20—23 to stage 10.

As described above, when the selector is passive the potential at the output terminals of circuits 24—27 is plus 303 volts and the potential at the output terminals of circuits 20—23 is plus 302 volts. As shown in FIG. 1, the output terminals of the circuits 20—23 and 24—27 are selectively connected, respectively, to the varistor and resistor sides of the sixteen AND gates A(1–16) in the stage 10. The input matrix or stage 10 comprises the sixteen AND gates A(1–16), each of which has a serially connected 1000-ohm resistor 13 and a varistor or diode 14. The varistors 14 are selectively connected to the input circuits 20—23 and the resistors 13 are selectively connected to the input circuits 24—27. One of the AND gates A(1–16) is located at each intersection of the output leads from the circuits 20—23 of the group 6 with the output leads from the circuits 24—27 of the group 7.

The AND gates A(1–16) have a very small power dissipation in the passive state because when all of the circuits 20–27 are passive, the varistor 14 in each of the AND gates A(1–16) is reverse-biased. When one of the circuits 20—23 and one of the circuits 24—27 are operated, the AND gate at the intersection of the output leads of the operated circuits is opened. A gate is "opened" when its varistor 14 is forward-biased. When the varistor 14 is forward-biased, the potential at the junction of the varistor 14 and resistor 13 decreases to the output potential of the activated ones of the circuits 20—23.

With circuits 20—27 normal or reset, each of the AND gates A(1–16) is closed, having its varistor 14 reverse-biased. The potential at the junctions between varistors 14 and resistors 13 is plus 302.2 volts due to a .8 volt drop across resistors 13. The 3.2 milliamperes, mentioned above, from each of the input circuits 24—27 are divided through four of the 1000-ohm resistors 13, and supplied to the associated ones of the impedance transformation pulse amplifiers PA(1–16). The .8 milliampere through the resistors 13 provides for the .8 volt drop and the 302.2-volt gate output potential. The sixteen amplifiers PA(1–16) are connected, respectively, from the output terminals of the AND gates A(1–16) to the resistive side of the output stage 12.

As shown in FIG. 2, the plus 302.2 volts and .8 milliampere from the stage 10 are provided to the base electrode of the transistor 80 in each of the amplifiers PA(1–16). The transistor 80 is a PNP junction power transistor having its emitter electrode connected to the plus 300-volt source 81 and its collector electrode connected through the 220-ohm resistor 83 to the plus 250-volt source 82. The load presented by the output matrix stage 12 to each of the amplifiers PA(1–16) is 206 ohms so that the total load presented to transistor 80 is 106 ohms. With plus 302.2 volts at its base electrode and plus 300 volts at its emitter electrode, the transistor 80 is in a relatively nonconducting condition. During the passive condition of the selector, each of the pulse amplifiers PA(1–16) provides a potential of plus 252 volts and a current of 8 milliamperes to the output stage 12. The transistor 80 has an alpha (current amplification factor) of approximately 0.97 and can supply currents up to 500 milliamperes.

Referring again to FIG. 1, the output stage 12 has 256 AND gates C(1–256), each having a serially connected varistor 19 and 3300-ohm resistor 17. The AND gates C(1–256) function in the same manner as that described above in reference to the AND gates A(1–16). The 8 milliamperes from each of the amplifiers PA(1–16) is divided through associated groups of sixteen of the resistors 17. One-half of 1 milliampere is therefore provided from each of the AND gates C(1–256) through the respectively connected terminals T(1–256) to the electronic switching network 18. The potential at each of the terminals T(1–256) is plus 250.35 volts due to the 1.65 volts across the 3300-ohm resistors 17 in the associated one of AND gates C(1–256).

The AND gates C(1–256) are closed when the selector is passive with the varistors 19 reverse-biased. The varistors 19 are reverse-biased by relatively positive potentials provided to the varistor side of the output stage 12 by the input stage 11.

The input stage 11 has sixteen double diode, or varistor, AND gates B(1–16) connected across the two sets of output terminals of the input circuits 28—31 and 32—35. Each of the gates B(1–16) has two serially connected varistors 15 and 16 which are connected across the output leads of the circuits 28—35. As described above, the output potential of the passive input circuits 28—35 is plus 253 volts. With a potential of plus 250.35 volts at the terminals T(1–256) and a potential of plus 253 volts at the output leads of circuits 28—35, the varistors 19 of the gates C(1–256) and the varistors 15 and 16 of the gates B(1–16), which are connected in series therewith, are reverse-biased. Varistor 19 of gate C1, for example, is connected to the junction of varistors 15 and 16 of gate B1. All three varistors are reverse-biased.

The selector has a low power dissipation when it is passive because all of the varistors 14, 19, 15 and 16 are reverse-biased, and the current provided to and supplied from the transformation amplifiers PA(1–16) is quite small.

*Fan-out condition*

In order to mark one of the terminals T(1–256) of the switching network 18, one input circuit of each of the four groups 6–9 is set. For example, to mark terminal T1, the input circuits 20, 24, 28 and 32 are set. As described above, the circuits 20, 24, 28 and 32 are set when a positive pulse is supplied to their respective input terminals. When the input circuits 20 and 24 are set, the potentials at their output terminals are changed, respectively, from plus 302 and 303 volts to plus 285 volts. The output potentials provided by circuits 21—23 remain at plus 302 volts and the output potentials provided by circuits 25—27 remain at plus 303 volts. With plus 302 volts at the varistor side of gates A5, A9 and A13 and plus 285 volts at the resistor side of the gates A5, A9 and A13, the varistors 14 of gates A5, A9 and A13 become forward-biased. The plus 17-volt difference of potential is applied substantially across the 1000-ohm resistors 13 of gates A5, A9 and A13 to provide three parallel 17-milliampere current paths. The 3 times 17, or 51, milliamperes are provided to the active input circuit 24 which functions as a current sink. Circuit 24 functions as a current sink when it is active or set because, as described above, the PNP junction transistor 93 is conductive when circuit 24 is set.

When varistors 14 in gates A5, A9 and A13 become forward-biased, the potential at the output of these gates changes from plus 302.2 volts to plus 302 volts, which is the passive output potential of circuits 21, 22 and 23. The circuits 21, 22 and 23 function as current sources, in this manner, when circuits 20 and 24 are set. As described above, the varistor 69, shown in FIG. 3, is removed in circuits 20—23 so that the battery 71 can function as an additional current source. The batteries 67 and 71 in circuits 21, 22 and 23 therefore function to supply the 51-milliampere current total through the gates A5, A9 and A13 to the circuit 24. Input circuit 23 additionally furnishes the passive current of 0.8 milliampere to the amplifier PA13 through gate A13.

When the output potentials of circuits 20 and 24 decrease to plus 285 volts, the output potential of gate A1 decreases from plus 302.2 volts to the triggering potential of the amplifier PA1. With the transistor 80 (FIG. 2) conductive, the emitter-base internal impedance provides for a potential difference of 2 volts so that the base electrode and input terminal of the amplifier PA1 is held at plus 298 volts. The emitter potential is plus 300 volts due to its direct connection to the plus 300-volt battery 81 (FIG. 2).

The output potential of gate A1 is the same as the input potential of amplifier PA1. With plus 298 volts at the output of gate A1 and plus 285 volts at each of the inputs to gate A1, the varistor 14 thereof is reverse-biased and current is supplied from amplifier PA1 through resistor 13 of gate A1 to the circuit 24. As indicated in FIG. 4, gate A1 receives 13 milliamperes from the amplifier which is provided to circuit 24. The circuit 24 functions, therefore, as a sink for the 17 milliamperes from each of the circuits 21, 22 and 23 through the gates A5, A9 and A13 and for the 13 milliamperes from the amplifier PA1 through the gate A1. The total current received by the set, or active, circuit 24 is 51 plus 13, or 64 milliamperes.

Except for the gates A1, A5, A9 and A13, the gates in stage 10 remain passive with their output potentials at plus 302.2 volts. The output potential of gates A5, A9 and A13 is changed slightly from plus 302.2 to plus 302 volts which is insufficient to trigger the associated pulse amplifiers PA5, PA9 and PA13. Only the pulse amplifier PA1, which is selected by setting circuits 20 and 24, is triggered.

When the amplifier PA1 is triggered, its output potential changes from plus 252 volts to plus 298 volts and its output current changes from 8 milliamperes to 205 milliamperes. The potential difference between the emitter, which is at plus 300 volts and the collector, is 2 volts. The plus 298-volt output potential is provided to the resistor side of the sixteen single varistor, or diode, AND gates C(1–16). The varistor sides of the AND gates C(1–16) are connected, respectively, as described above, to the outputs of the sixteen double varistor, or diode, AND gates B(1–16) of stage 11.

To operate the selector for marking one of the terminals T(1–256) of the switching network 18, one of the circuits 28—31 and one of the circuits 32—35 are set in addition to setting circuits 20 and 24. As described above, in the example described herein, the circuits 28 and 32 are set in addition to circuits 20 and 24 to mark the terminal T1. When the circuits 28 and 32 are set, their output potentials change from plus 253 volts to plus 300 volts. The output potentials increase instead of decreasing as does that of circuit 24 because, as described above, the input terminals to circuits 28—35 are reversed. The transistor 93 (FIG. 3) in circuits 28—35, for example, is normally conductive instead of non-conductive. With an increased potential at the output leads of circuits 28 and 32, the AND gate B1 remains closed with varistors 15 and 16 thereof reverse-biased. The other fifteen AND gates B(2–16), however, open. The gates B(2–16) open because the increase of potential at the output of the amplifier PA1 provides an increase of potential at each of the outputs of gates B(2–16). The only one of gates B(1–16) having its two control potentials increased over that provided by amplifier PA1 is the gate B1. The current from the amplifier PA1 is divided essentially through the serially connected resistors 17 and varistors 19 of the fifteen gates C(2–16). The respective conductive paths are through the fifteen varistors 19 of gates C(2–16) and the gates B(2–16) to the passive circuits 29—31 and 32—35. The varistors 16 of stages B1, B5, B9 and B13 are reverse-biased by circuit 28 and the varistors 15 of gates B(1–4) are reverse-biased by the circuit 32. All the other varistors 15 and 16 in stage 11 become forward-biased or conductive when circuits 20, 24, 28 and 32 are set.

In addition to the current supplied to the stage 11, a small amount of current from the amplifier PA1 is also provided through the terminals T(1–16) to the switching network 18. The amplifier PA1 supplies 0.5 milliampere through terminals T(2–16) and 1 milliampere through terminal T1. The current through terminal T1 is greater because the potential at terminal T1 is increased when the amplifier PA1 is triggered. The 205 milliamperes from the amplifier PA1 is divided up as follows: 0.5 milliampere through each of the terminals T(2–16); 1 milliampere through the terminal T1; and 13.1 milliamperes to each of the AND gates B(2–16). The total current provided to the stage 11 is 15 times 13.1, or 196.5 milliamperes. The 196.5 milliamperes are supplied in equal amounts to the six passive circuits 29–31 and 33–35. Each of the six passive circuits 29–31 and 33–35 functions in this manner as a sink for 32.75 milliamperes.

With plus 298 volts at the output terminal of amplifier PA1 and a total of 13.1 plus 0.5 milliamperes through the 3300-ohm resistor 17 of each of the gates C(2–16), the fan-out potential at each of the terminals T(2–16) is plus 253 volts. The terminals T(2–16) are connected, respectively, through the forward-biased varistors 19, 15 and 16 to the outputs of circuits 29—31 and 33—35, which outputs are at the plus 253-volt potential.

The gate B1 does not allow current to the circuits 28 and 32 because, as described above, the varistors 15 and 16 of gate B1 are reverse-biased. The output potential at terminal T1 is determined by the voltage drop across resistor 17 of gate C1 due to the fan-out current through gate C1 and terminal T1 to the switching network 18. The output fan-out potential of amplifier PA1 is plus 298 volts and the current through the 3300-ohm resistor 17 of gate C1 is 1 milliampere so that the selector output potential at terminal T1 is 294.7 volts.

To briefly recapitulate, when the circuits 20, 24, 28 and 32 are set, the potential at terminal T1 is increased from plus 250.35 volts to plus 294.7 volts; the potential at terminals T(2–16) is increased from plus 250.35 volts to plus 253 volts which is below the marking potential of the network 18; and the potential at terminals T(17–256) remains the same at plus 250.35 volts. The selector remains in its fan-out condition with plus 294.7 volts at terminal T1 until the electronic switching network 18 breaks down.

*Breakdown condition*

A short interval after terminal T1 is marked by the increase of potential from plus 250.35 volts to plus 294.7 volts, a path is established from terminal T1 through the network 18. The operation of the electronic switching network 18 is described, for example, in the above-identified disclosure by Bruce et al. When the network 18 breaks down, the impedance presented thereby to terminal T1 of the selector decreases materially. When the impedance presented by the network 18 decreases, the current through terminal T1 increases from 1 to 15 milliamperes and the potentional at terminal T1 decreases from plus 294.7 volts to plus 248.5 volts due to the increased voltage drop across resistor 17 of gate C1. The amplifier PA1 is substantially a constant current source when triggered so that it continues to supply 205 milliamperes to the output stage 12. During the breakdown condition of the network 18, the 205 milliamperes are divided up as follows: 15 milliamperes through terminal T1; .5 milliampere through each of terminals T(2–16); and 12.2 milliamperes through each of the forward-biased diodes 19 of gate C(2–16) to the input stage 11. The 12.2 times 15, or total of 183 milliamperes is supplied to the six passive circuits 29–31 and 33–35. Each of the circuits 29–31 and 33–35 functions, in this manner, as a sink to receive 30.5 milliamperes from the input stage 11. When the potential at terminal T1 decreases to plus 248.5 volts, the potential at the output of gate B1 decreases to 255.9 volts. Gate B1 remains closed, of course, since the potentials provided from circuits 28 and 32 thereto are plus 300 volts. All other voltage and current conditions in the selector remain at their fan-out condition when the network 18 breaks down.

The selector functions as a low input impedance device when the switching network breaks down. A rapid increase in current through terminal T1 is achieved merely by diverting some of the current which was provided from the amplifier PA1 to the input stage 11. The selector functions as a low impedance current source to terminal T1 of the network 18 because the stages 10 and 11 do not add to the output impedance. The stages 10 and 11 do not contribute to the output impedance because of the interposition of the amplifiers PA(1–16) between the stages 10 and 12.

As described in the above-identified disclosure by Bruce et al., the network 18 locks in upon breakdown. The circuits 20, 24, 28 and 32 may, therefore, be reset without releasing the path established through the network 18. The network 18 includes means for releasing established paths, which means are also described in the above-identified disclosure by Bruce et al.

The circuits 20–35 can thereupon be selectively operated to mark another one of the terminals T(1–256).

The number of inputs to the varistor side of the output stage 12 may be increased or decreased without materially affecting the selector performance. The stage 11 could be, for example, a five-by-five matrix having twenty-five outputs instead of a four-by-four matrix having sixteen outputs. During the fan-out and breakdown conditions of the selector, the excess amplifier current would then be divided into twenty-four paths instead of fifteen. The predetermined switching network terminal would be marked in exactly the same manner. The marking potential and current remain, therefore, the same with substantial changes in the number of terminals to be marked. With a five-by-five input stage 11, 400 terminals could be selectively marked instead of 256. Utilizing even larger stages 11 provides, of course, for still more output terminals. This increase in output terminals, or selector flexibility is achieved without changing the number of pulse amplifiers or the size of stage 10.

The number of inputs to the resistor side of the output stage may also be increased or decreased. Increasing the size of stage 10 requires a corresponding increase in the number of required amplifiers. Increasing the size of stage 10 and the number of amplifiers does not change the current and voltage conditions at any point in the selector and in particular at the output terminals. The size of the selector, therefore, may be increased indefinitely without changing the passive, fan-out and marking potential and current conditions. The only limitation in size would be the current carrying abilities of the varistors 15 and 16 and the amount of current that can be adsorbed by the circuits 28—35. The size of each of the rectangular or coordinate arrays of AND gates may, in this manner, be readily changed.

It is to be understood that the above-described arrangements are illustrative of the application of the principles of this invention. Numerous other arrangements may be devised by those skilled in the art without departing from the spirit and scope of the invention. For example, additional stages may be utilized, and different numbers of gates, as indicated above, may be utilized in each of the matrix stages. It is evident, therefore, that numerous other arrangements may be devised without departing from the spirit and scope of the invention.

What is claimed is:

1. A matrix selector comprising a first and a second input stage, each of said input stages having a plurality of input terminals arranged in groups and a plurality of coincidence gates and a plurality of output terminals greater in number than the number of said input terminals and connected to said coincidence gates, each of said first input stage coincidence gates having a resistor connected to one of said first input stage input terminals of one of said groups and a varistor connected to one of said first input stage input terminals of another of said groups, each of said second input stage coincidence gates having a first varistor connected to one of said second input stage input terminals of one of said groups and a second varistor connected to one of said second input stage input terminals of another of said groups; and an output stage having a plurality of output terminals greater in number than the sum of said first input stage output terminals and said second input stage output terminals and gating means controlled by both said first and said second input stages for marking one of said output stage output terminals.

2. A matrix selector in accordance with claim 1 comprising, in addition, means for normally reverse-biasing said first input stage varistor and said second input stage first and second varistors.

3. A matrix selector in accordance with claim 1 comprising, in addition, a plurality of impedance transformation devices connected between said first input stage output terminals and said output stage.

4. A matrix selector in accordance with claim 1 wherein said gating means includes a plurality of coincidence gates having a varistor and a resistor and means for normally reverse-biasing said gating means varistor.

5. A low impedance selector comprising an output matrix having a plurality of diode-resistor AND gates arranged in a coordinate array, means connecting an output terminal to each connection between said diodes and resistors in said output matrix AND gates, a first input matrix having a plurality of diode-resistor AND gates arranged in a coordinate array, means for normally reverse biasing said first input matrix diodes and for forward biasing only a selected one of said diodes, means for connecting said first input matrix diodes to said output matrix resistors in one coordinate of said output matrix array, a second input matrix having a plurality of double diode AND gates arranged in a coordinate array, means for normally reverse biasing said second input matrix diodes and for selecting one of said double diode AND gates, and means connecting the connection between said diodes of each second input matrix AND gate to said output matrix diodes in a second coordinate for forward biasing at least one diode of each of said double diode AND gates but the selected one of said double diode AND gates on selection of one of said first input matrix diodes for selection of a particular one of said output terminals.

6. A low impedance selector circuit for applying marking potentials to a plurality of output terminals comprising an output matrix comprising a plurality of resistor-diode AND gates arranged in a coordinate array, each of said output terminals being connected to the connection between a resistor and a diode of one of said AND gates, first input matrix means connected to said output matrix for changing the potential applied to the resistors in one coordinate of said output array for forward biasing their associated diodes, said first input matrix means including a diode-resistor AND gate matrix and means for forward biasing a selected one of said diodes in said first input matrix means, and second input matrix means connected to said output matrix for reverse-biasing only a particular one of said output matrix diodes connected to said resistors in said one coordinate, said second input matrix means including a double-diode AND gate matrix and means for applying biasing potentials to said double-diode AND gates to forward bias at least one diode in each of said double-diode AND gates but said double-diode AND gate connected to said particular one of said output matrix diodes in a second coordinate of said output matrix whereby said potential change is applied to only said output terminal connected to said particular one of said output matrix diodes.

7. A low impedance selector circuit in accordance with claim 6 further comprising impedance transformation amplifying means connecting said first input matrix means to said output matrix.

References Cited in the file of this patent

UNITED STATES PATENTS

| | | |
|---|---|---|
| 2,244,700 | Horton | June 10, 1941 |
| 2,428,811 | Rajchman | Oct. 14, 1947 |

(Other references on following page)

UNITED STATES PATENTS

| | | |
|---|---|---|
| 2,476,066 | Rochester | July 12, 1949 |
| 2,563,824 | Dunlap | Aug. 14, 1951 |
| 2,684,405 | Bruce et al. | July 20, 1954 |
| 2,686,299 | Eckert | Aug. 10, 1954 |
| 2,691,151 | Toulon | Oct. 5, 1954 |

FOREIGN PATENTS

| | | |
|---|---|---|
| 769,384 | Great Britain | Mar. 6, 1957 |

OTHER REFERENCES

Proceedings of I.R.E. (Brown et al.), February 1949, pp. 139–147.

Book by Keister et al.: "Design of Switching Circuits," New York, Van Nostrand Co., 1951, pp. 323–324 relied on.